No. 739,825. PATENTED SEPT. 29, 1903.
G. D. BURTON.
PROCESS OF TREATING ANIMAL HIDES OR SKINS.
APPLICATION FILED NOV. 8, 1898. RENEWED FEB. 25, 1903.
NO MODEL. 2 SHEETS—SHEET 1.

WITNESSES
S. M. Dosett,
E. J. W. Clarkson

INVENTOR
G. D. Burton
By F. C. Somes,
Attorney.

No. 739,825. PATENTED SEPT. 29, 1903.
G. D. BURTON.
PROCESS OF TREATING ANIMAL HIDES OR SKINS.
APPLICATION FILED NOV. 8, 1898. RENEWED FEB. 25, 1903.
NO MODEL. 2 SHEETS—SHEET 2.

WITNESSES
S. M. Dorsett
E. J. W. Clarkson

INVENTOR
G. D. Burton
By F. C. Somes,
Attorney.

No. 739,825. Patented September 29, 1903.

UNITED STATES PATENT OFFICE.

GEORGE D. BURTON, OF BOSTON, MASSACHUSETTS.

PROCESS OF TREATING ANIMAL HIDES OR SKINS.

SPECIFICATION forming part of Letters Patent No. 739,825, dated September 29, 1903.

Application filed November 8, 1898. Renewed February 25, 1903. Serial No. 145,096. (No specimens.)

*To all whom it may concern:*

Be it known that I, GEORGE DEXTER BURTON, a citizen of the United States of America, residing in Boston, in the county of Suffolk, in the State of Massachusetts, have invented certain new and useful Improvements in Processes of Treating Animal Hides or Skins, of which the following is a specification.

This invention relates to the art of unhairing, tanning, or otherwise treating hides or skins by subjecting them to the action of a suitable electrolytic solution and passing an electric current through said solution, in which the hides or skins are placed.

The object of the invention is to facilitate the passage of the electric current and the circulation of the solution.

Figure 1:
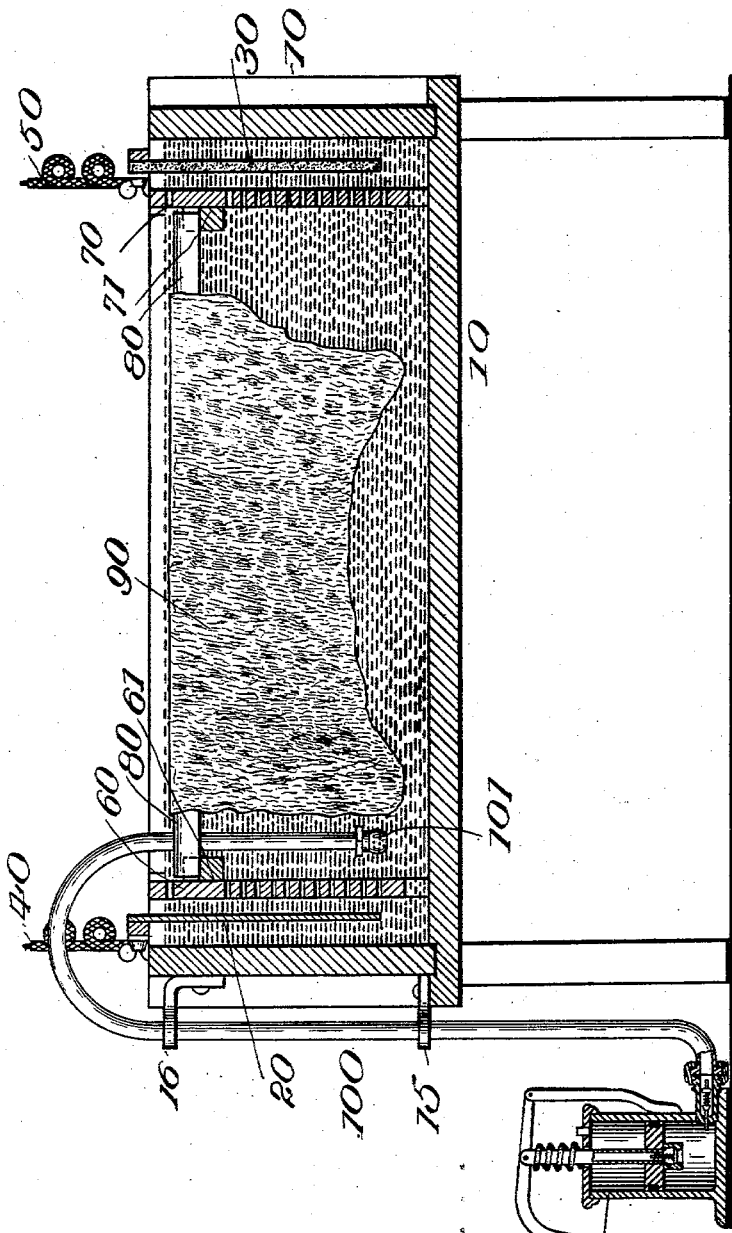
Figure 2:
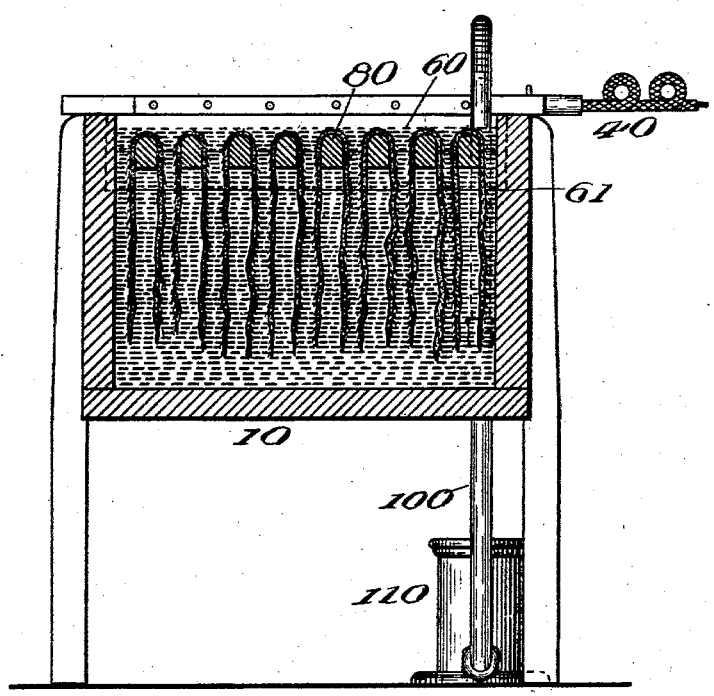

Figure 1 of the accompanying drawings represents a longitudinal vertical section of an apparatus for carrying out this process. Fig. 2 represents a transverse section thereof.

Similar reference-numerals indicate corresponding parts in both the figures.

A suitable vat or tank 10, constructed of any suitable material, contains the electrolytic solution, such as any suitable unhairing solution or any suitable tanning solution. This tank is preferably about seven feet long, five feet deep, and four feet wide. A positive electrode 20 is disposed in the tank, preferably near one end thereof, and a negative electrode 30 is also disposed in the tank, preferably near the other end thereof. These electrodes are preferably composed of material which will neither dissolve nor disintegrate by the action of the electrolytic solution. They are in the form of plates suspended transversely across the vat. The positive electrode 20 is connected with the positive source of electricity by a conductor 40, and the negative electrode 30 is connected with the negative pole of the electric source by a conductor 50. A screen 60, preferably composed of wood or any other suitable non-conductive perforated material, is disposed transversely of the tank in front of the positive electrode 20, and a similar screen 70 is disposed transversely of the tank in front of the negative electrode 30. The screen 60 is provided near its top with a transverse bar 61, and the screen 70 is provided near its top with a transverse bar 71. A series of rods 80 are disposed longitudinally of the tank below the normal level of the solution therein. These rods are supported at their opposite ends on the bars 61 and 71. The skins 90 are suspended on these longitudinal rods, a skin being folded over each rod and depending on opposite sides thereof in the solution. The rods are disposed apart from each other sufficiently to permit a free circulation of the liquid between each hide or skin and are of sufficient thickness to allow such circulation between the folds of each hide or skin, and the disposition of the rods longitudinally of the tank with their ends toward the electrodes permits the free circulation of the current between the dependent folds of the hides or skins. The skins are preferably hung with the hair side of each skin facing the hair sides of adjacent skins. An air-pipe 100, supported on brackets 15 and 16, attached to one end of the tank, extends downward into the tank and is provided with a perforated discharge-nozzle 101 at its lower end. The outer end of this pipe is connected with an air-forcing apparatus 110, of any suitable form. By this means air may be forced into the solution in the tank and cause the circulation thereof. The air so introduced not only causes a circulation of the solution or agitation thereof, but also aerates and cleanses the solution.

In carrying out this process by the use of this apparatus the hides or skins, preferably whole, are folded and hung over the several suspension-rods 80, in which case they are totally submerged by the solution, which for unhairing may be any suitable solution known to the art for that purpose and for tanning any suitable tanning solution. A good unhairing solution consists of quicklime, red sulfid of arsenic, and water in the proportions of seventy gallons of water to ten pounds of quicklime and one pound of red sulfid of arsenic. The hides or skins are preferably soaked in fresh water for, say, twenty-four hours before subjection to this treatment. Any current of electricity of from six to five hundred volts and from five to five hundred amperes, according to the size of the tank and quantity of the solution and the number of skins in the solution, is passed through the solution in which the hides or skins are suspended. This current has a tendency to set up an electrolytic action in the solution containing the hides or skins which causes the destruction of all germs therein, at the same time preserving the gelatin matter in the hides or skins. The current has free access to the hide or skin surfaces, as also has the solution. The hides or skins may be subjected to this action until the hair-cells become sufficiently softened to allow the hair to slip. I have found that a treatment of thirty minutes suffices in some cases, owing to the free circulation of the solution and the passage of the current. The electricity has a tendency to raise the hair and permit a free circulation of the liquid around the hair-cells. The skins are then submitted to a drenching solution, then again suspended on the bars of the tank and a tanning solution placed therein. The electric current is again turned on, and the hides or skins are subjected to the action of the electrolyzed tanning solution, the current being of such a volume as to open the pores and permit a free circulation of the solution around them, causing a quick penetration of the tanning material and a hardening of the gelatinous matter, thereby preserving the gelatin in the hides or skins so treated.

Any suitable agitating means may be used; but the air-current is preferable, as it tends to purify the solution. Where I use the word "air" for agitating, circulating, and purifying the unhairing or tanning solution, I wish to reserve the right to use any suitable gas for this purpose or a combination of gases.

A good tanning solution may consist of extract of hemlock-bark, starting the tanning process with a one-and-one-half-degree tanning liquor, barkometer test. This liquor is strengthened from time to time as the hides or skins absorb the tanning material until a gravity of about 14°, barkometer test, is obtained, when the skins will be found to be tanned. I have also used gambia, sumac, quebracho and palmetto, oak, and other extracts and obtained excellent results, starting the tanning process with about a one-degree liquor and completing the process with about a thirteen-degree liquor, barkometer test, when the above-mentioned extracts are used. I have sometimes added extract of logwood to the above tanning extracts for the purpose of giving the skins or hides a dark color. I have also used after the skins have been unhaired and washed in water a solution in the proportion of four pounds of sal-ammoniac to thirty gallons of water. The skins or hides are taken from the water and are drenched with sal-ammoniac and luke-warm water, through which a current of electricity is passed varying from six to five hundred volts and from one ampere to one hundred amperes, in proportion to the size of the tanks, the quantity of solution, and the number of hides or skins being treated. This drenching process purifies the skin or hide and has a tendency to counteract the lime and plumps the skin or hide to a high degree. This process completed, the hides or skins may be again washed in water and are then ready to proceed with the tanning process. This treatment takes the place of what is known as "bating" in the tanning art with such material or substance as pigeon, dog, or hen manure. For such skins as sheep, calf, kangaroo, and the like the above-described process of bating is used with very satisfactory results.

Any suitable electrodes may be used; but I obtain the best results by using one copper electrode and one lead electrode and by connecting the positive pole to the lead plate.

While I obtain the best results by placing the skins hair sides to each other, fairly good results are obtained by reversing the skins and placing the flesh sides to each other, and this specification is intended to cover either method.

I claim as my invention—

The process of treating animal hides or skins, which consists in suspending them in an electrolytic unhairing solution, subjecting them to the action of said solution and a current of electricity passed therethrough in lines parallel with the skins, said current being of sufficient volume to open the pores of the hides or skins and increase the action of the solution, and passing a current of air through said solution during the passage of the electric current.

GEO. D. BURTON.

Witnesses:
E. F. PHILIPSON,
ALBERT G. Y. MACADAM.